United States Patent
Walters (10) Patent No.: US 8,571,167 B2
(45) Date of Patent: Oct. 29, 2013

(54) PARTICULATE METAL FUELS USED IN POWER GENERATION, RECYCLING SYSTEMS, AND SMALL MODULAR REACTORS

(75) Inventor: Leon C. Walters, Idaho Falls, ID (US)

(73) Assignee: Advanced Reactor Concepts LLC, Reston, VA (US)

( * ) Notice: Subject to any disclaimer, the term of this patent is extended or adjusted under 35 U.S.C. 154(b) by 792 days.

(21) Appl. No.: 12/696,851

(22) Filed: Jan. 29, 2010

(65) Prior Publication Data

US 2010/0303193 A1     Dec. 2, 2010

Related U.S. Application Data

(60) Provisional application No. 61/182,954, filed on Jun. 1, 2009.

(51) Int. Cl.
*G21C 3/00* (2006.01)

(52) U.S. Cl.
USPC ............ 376/422; 376/409; 376/412; 376/421

(58) Field of Classification Search
USPC ......... 376/409, 412, 418, 420–422, 426, 428, 376/429, 433, 457
See application file for complete search history.

(56) References Cited

U.S. PATENT DOCUMENTS

| | | | |
|---|---|---|---|
| 3,042,594 A | 7/1962 | Hauth | |
| 3,261,378 A | 7/1966 | Ayer et al. | |
| 3,322,509 A | 5/1967 | Vogg | |
| 3,328,133 A | 6/1967 | Ishihara et al. | |
| 3,413,383 A | 11/1968 | Hirose et al. | |
| 3,442,762 A | 5/1969 | Denton | |
| 3,683,975 A | 8/1972 | Sease et al. | |
| 3,808,320 A | 4/1974 | Kaiser et al. | |
| 4,004,972 A | 1/1977 | Mogard | |
| 4,050,638 A * | 9/1977 | Ito et al. ................. | 241/222 |
| 4,225,560 A | 9/1980 | Nakanishi et al. | |
| 4,292,127 A | 9/1981 | Hartley et al. | |
| 4,624,828 A | 11/1986 | Alexander | |
| 4,717,534 A * | 1/1988 | Morita .................... | 376/419 |
| 4,814,046 A | 3/1989 | Johnson et al. | |
| H689 H * | 10/1989 | Christiansen et al. ...... | 376/361 |
| 4,997,596 A | 3/1991 | Proebstle et al. | |

(Continued)

FOREIGN PATENT DOCUMENTS

| | | | |
|---|---|---|---|
| JP | 50014318 B | 5/1975 | |
| JP | 60181694 A | 9/1985 | |

(Continued)

OTHER PUBLICATIONS

International Search Report and Written Opinion for related application PCT/US10/35412, mailed Aug. 31, 2010.

(Continued)

*Primary Examiner* — Jack W Keith
*Assistant Examiner* — Marshall O'Connor
(74) *Attorney, Agent, or Firm* — Patton Boggs LLP (57) ABSTRACT

A metal particulate fuel system is described. The metal fuel system may include particulate metal fuel for use in nuclear reactors. The particulate metal fuel may include a plurality of particles of at least one enriched alloy where the particles are compacted into a fuel column. The metal particulate fuel system may also include a cladding and/or a gas-filled plenum.

22 Claims, 6 Drawing Sheets

(56) References Cited

U.S. PATENT DOCUMENTS

| | | | |
|---|---|---|---|
| 5,112,534 | A | 5/1992 | Guon et al. |
| 5,219,519 | A | 6/1993 | Matzner |
| 5,400,375 | A | 3/1995 | Suzuki et al. |
| 5,419,886 | A | 5/1995 | Grantham et al. |
| 5,446,773 | A | 8/1995 | Wakabayashi |
| 5,828,715 | A | 10/1998 | Kurosaki et al. |
| 6,251,310 | B1 | 6/2001 | Song et al. |
| 6,263,038 | B1 | 7/2001 | Kantrowitz et al. |
| 6,668,034 | B2 | 12/2003 | Mahe |
| 6,674,830 | B2 | 1/2004 | Kato et al. |
| 7,445,760 | B2 | 11/2008 | Fukasawa et al. |
| 7,521,007 | B1 | 4/2009 | Jarvinen et al. |
| 2001/0007584 | A1 | 7/2001 | Adamson et al. |
| 2007/0280400 | A1 | 12/2007 | Keller |
| 2007/0290178 | A1 | 12/2007 | Baron et al. |
| 2008/0144762 | A1* | 6/2008 | Holden et al. ............ 376/416 |

FOREIGN PATENT DOCUMENTS

| | | |
|---|---|---|
| JP | 02184792 A | 7/1990 |
| JP | 06194477 A | 7/1994 |
| JP | 07294676 A | 11/1995 |
| JP | 09033687 A | 2/1997 |
| JP | 09043389 A | 2/1997 |
| JP | 09043391 A | 2/1997 |
| JP | 09119994 A | 5/1997 |
| JP | 2008170252 A | 7/2008 |

OTHER PUBLICATIONS

S.D. Herrmann, et al, "Electrolytic Reduction of Spent Nuclear Oxide Fuel as Part of an Integral Process to Separate and Recover Actinides from Fission Products", Separation Science and Technology 41, pp. 1965-1983, (2006).

Yuji Kosaka, et al, "A Study on Fission Products Removal by the Dry Pyrochemical Technique for the Fuel Decladding,"Proceedings of Global 2005, paper 199, Tsukuba, Japan, Oct. 2005.

Kec Chan Song el al, "Fractional Release Behavior of Volatile and Semivolatile Fission Products During a Voloxidation and OREOX Treatment of Spent PWR Fuel", Nuclear Technology, vol. 162, pp. 158-168, May 2008.

T.R. Thomas, "AIROX Nuclear Fuel Recycling and Waste Management", Proceedings, Global 93, vol. 2, pp. 723-728, Seattle WA, Sep. 1993.

Herrmann et al, "Electrolytic Reduction of Spent Nuclear Oxide Fuel as Part of an Integral Process to Separate and Recover Actinides from Fission Products", Separation Science and Technology 41, pp. 1965-1983, (2006).

Kosaka et al, "A Study on Fission Products Removal by the Dry Pyrochemical Technique for the Fuel Decladding,"Proceedings of Global 2005, paper 199, Tsukuba, Japan, Oct. 2005.

Kee Chan Song el al, "Fractional Release Behavior of Volatile and Semivolatile Fission Products During a Voloxidation and OREOX Treatment of Spent PWR Fuel", Nuclear Technology, vol. 162, pp. 158-168, May 2008.

Thomas, "AIROX Nuclear Fuel Recycling and Waste Management", Proceedings, Global 93, vol. 2, pp. 723-728, Seattle WA, Sep. 1993.

Ogata et al., "Directions of Metal Fuel Development for Fast Reasctors," Proceedings of Global 2009, paper 9135, Paris, France, pp. 1456-1464; Sep. 6-11, 2009.

* cited by examiner

FIG. 1

Prior Art

FIG. 2

Prior Art

PARTICULATE METAL FUELS USED IN POWER GENERATION, RECYCLING SYSTEMS, AND SMALL MODULAR REACTORS

CROSS-REFERENCE TO RELATED APPLICATIONS

This application claims the benefit of U.S. Provisional Patent Application No. 61/182,954, filed Jun. 1, 2009; the content of which is incorporated by reference herein in its entirety.

FIELD OF THE INVENTION

The present invention relates to nuclear fuels, reactors and power plants, and, more specifically, to particulate metal fuel.

BACKGROUND OF INVENTION

Electricity Demand

World electricity demand is expected to double by 2030 and quadruple by 2050. The world electricity demand increase is forecasted to come from developed countries and, to an even larger extent, developing countries. To meet this rapid growth in demand, nuclear power may be a realistic, cost-effective energy source.

Increased energy supply from other sources, such as contribution from natural gas powered generation may be constrained by high and volatile gas prices, greenhouse gas emissions, and concerns over longer-term dependence on unstable sources of supply. Meanwhile, forms of alternative energy (solar, wind, biomass, hydroelectric, etc.) may be useful in satisfying some of the increased demand. They do not, however, scale sufficiently and cannot provide enough additional electric generating capacity in most markets to meet any significant part of the new electricity demand.

Conventional nuclear power plants may also meet part of the added demand. Conventional nuclear power plants, however, have severe obstacles to overcome. These obstacles include: finance capital costs ranging from $3 billion to over $6 billion; uncertainty about waste fuel disposal; and insufficient grid capacity to accommodate large base-loaded power plants.

Coal power plants may also provide some additional supply, but burning mass quantities of coal presents serious political obstacles given the negative environmental impacts.

Needs exist for modular, transportable, self-contained reactors for distributable power to meet the energy demands of the future using new fuels. Any such reactors may be located near consumers, dramatically reducing the need for large and expensive additions to electricity distribution grids. Any long-term, self-contained and clean power sources may have broad applications in markets across the globe.

Traditional Metal Fuels

Metal fuel was the first fuel to be used in nuclear reactors. Later ceramic fuels became common because the early metal fuels were not capable of extended life in a reactor core. Furthermore, there were concerns of excessive fuel cladding interaction at high temperatures.

Figure 1:
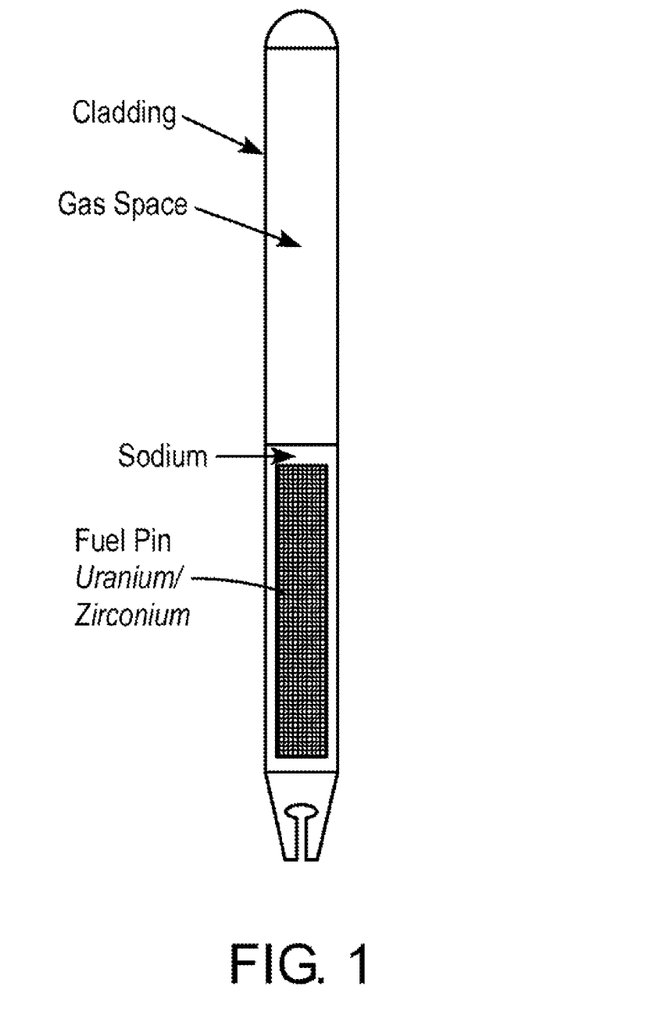
FIG. 1 shows a sodium-bonded metal fuel element.
Figure 2:
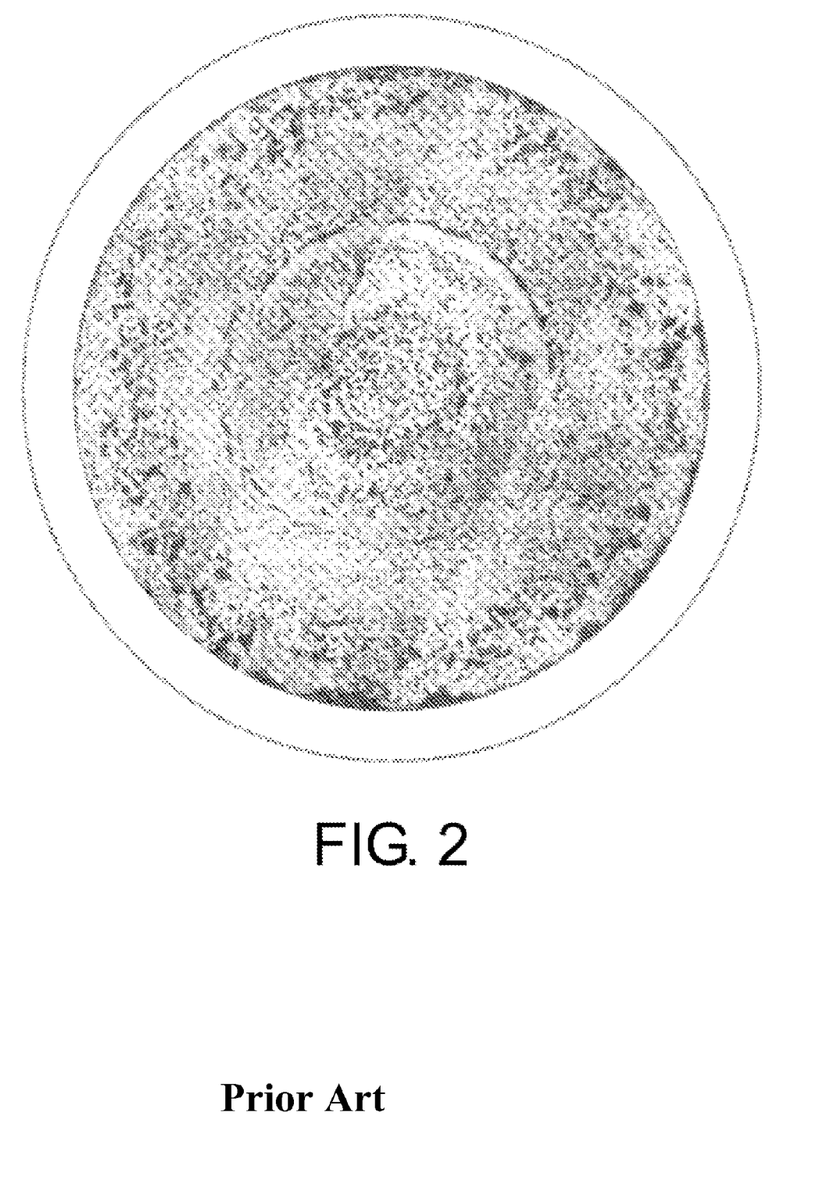
FIG. 2 shows a cross-section of an irradiated metal fuel element.

The deficiencies of the early metal fuels were addressed with a configuration capable of very high reactor exposures where metal fuel alloys prevented excessive fuel cladding interactions (See FIG. 1). FIG. 2 shows a cross-section of an irradiated metal fuel element. The types of metal fuels used in FIG. 1 had significant safety advantages over ceramic fuels because of high thermal conductivities of the metal fuels.

Over 100,000 metal fuel elements have been utilized as driver fuel in the Experimental Breeder Reactor ("EBR-II") and the metal fuel elements have been tested in the Fast Flux Test Facility (FFTF). The fabrication and performance of these metal fuels will be described briefly to allow comparison to the metal fuels of the present invention.

Traditional metal fuels, which have been chosen for several of new domestic and foreign fast reactor concepts, are a cast solid pin of enriched uranium alloy that is sodium bonded inside a low-swelling cladding. The sodium bond fills an appropriately sized gap between the traditional metal fuel and the cladding to facilitate heat transfer at early stages of irradiation. After about 1.5% burnup, the traditional metal fuel itself generally swells to contact the cladding inner diameter and can achieve an excellent heat transfer path. Interconnected porosity can provide a pathway to a gas plenum, which prevents further radial swelling. An extensive performance database exists for traditional metal fuels with over 100,000 metal fuel elements irradiated in EBR-II and tested in both normal and off-normal conditions.

The fuel pin inside the cladding of the older EBR-II and FFTF metal fuel is an alloy of uranium-molybdenum, uranium-zirconium, or uranium-plutonium-zirconium. The fuel pin is injection cast into VYCOR glass molds. Injection casting was chosen for fabrication of the fuel pins because it was useful when used in remote operations for the fabrication of reprocessed fuel. The melting point of the alloys must be less than the softening point of the VYCOR glass molds; thus, the range of possible alloys is limited.

When the fuel pin is broken away from a mold, some of the fuel sticks to the glass mold and must be either treated as a waste product or the glass must be processed to recover the uranium in the fuel. The fuel pin is then loaded into a cladding tube that contains sodium. The cladding tube, with the fuel pin, is heated to melt the sodium. The sodium then fills the gap between the fuel pin and cladding to provide a heat transfer path. The fuel element is vibrated or impacted to remove any voids between the fuel pin and cladding. The fuel element is then inspected with eddy-current or ultrasonic techniques to assure that all the voids have been removed.

End caps are welded on the fuel elements and final inspections are performed. The elements are then placed in a hexagonal steel duct for placement in a reactor. Before the hexagonal steel ducts that contain the elements can be put into a liquid sodium coolant of the reactor, they must be heated from the top downward in a complex fuel loading machine. The reason for the directional heating and melting is that if the ducts were placed directly into the reactor pool, the sodium in the fuel elements would liquefy first from the bottom up and the solid sodium would inhibit adequate thermal expansion of the liquid sodium in the axial direction. The radial expansion of the liquid sodium could deform the cladding.

During the initial stages of irradiation, the generation of fission gas within the fuel pin causes the fuel pin to swell to the inner surface of the cladding. The sodium that was in the gap is displaced into the gas plenum, thus, reducing the volume of the plenum available for released fission gas. The gap between the fuel pin and cladding is designed such that just as the fuel pin reaches the cladding, the pores that form from fission gas in the fuel interconnect. The fission gas is then released into the plenum. Therefore, the stress on the cladding is greatly reduced because the fuel tends to flow back into the open porosity rather than stressing the cladding. This design feature is what allows the metal fuel element to achieve high in-reactor exposures. Once the fission gas is released to the plenum, the driving force for swelling is greatly reduced. The final fuel density for fission gas release prior to cladding contact is 75% or less.

The traditional metal fuels are made by injection casting of sodium bonded metal fuel. These casts greatly limit the range of alloy compositions to be used in the injection cast fuel because of softening of the molds, e.g., VYCOR molds. Additionally, the traditional metal fuel casting process may suffer a loss of volatile components such as americium. Fissile material of the traditional metal fuel tends to cling to the molds, e.g., VYCOR molds. Also, traditional metal fuel processing requires operations to remove bond voids and nondestructive inspections for voids.

Legacy and Future Spent Fuel

An area of concern for nuclear energy is the disposal of light water reactor ("LWR") spent nuclear fuel ("SNF"). Directly disposing of the LWR SNF requires sequestering for thousands of years. Alternatively, aqueous reprocessing of LWR SNF to remove the long-lived radioactive elements for fission consumption in fast reactors is possible, but expensive. A small fraction of LWR SNF is made up of long-lived actinides (e.g., plutonium, neptunium, and americium) that dominate long-term disposal requirements. In addition, the actinides can represent a potential proliferation risk if entities of concern attempt to recover them for use in nuclear weapons. Therefore, there is a need for a simpler and direct way for handling and disposing of LWR SNF.

Another area of interest for nuclear energy is the recovery of energy still contained in LWR SNF through the presence of the actinides mentioned above. Of the actinides, americium presents a major challenge since it is a major long-term hazard in a repository environment (arising from heat generation and decay to Np237) and its high volatility makes recovery from reprocessing and repackaging into new fuel host difficult. Therefore, there is a need for a means and method for ensuring americium can be recovered for use and energy recovery.

SUMMARY OF INVENTION

Certain embodiments of the present invention may provide a long-life fuel cartridge core that fixes fuel costs for 15 or more years. Other embodiments may provide a Small Modular Reactor ("SMR") including a long-life fuel cartridge core that fixes fuel costs for multiple years, including 15 or more years, and eliminates on-site refueling needs.

Certain embodiments of the present invention can enhance the attractiveness and viability for large-scale utilization of liquid metal cooled fast neutron spectrum reactors using a metal alloy fuel of the present invention. Certain embodiments of the present invention may provide a liquid-metal cooled, fast-neutron-spectrum reactor using a metal alloy fuel. Embodiments of the reactor can be portable and replaceable. In certain embodiments, the metal fuel may include a particulate of metal alloy. Another embodiment may provide a metal fuel capable of breeding its own fuel. Yet another objective may be to provide a metal fuel capable of utilizing crushed particulates from LWR fuel that results from decladding and/or crushing LWR spent fuel. Another embodiment may provide a metal fuel with one or more minor actinides. Yet another embodiment of the present invention may attack the LWR legacy and future spent fuel problem while at the same time allowing the disclosed reactor to generate energy from the uranium, plutonium, and minor actinides in the LWR spent fuel.

In certain embodiments, a metal fuel form may be provided for factory production. Another embodiment of the present invention may provide a simplified, lower temperature fabrication method for metal fuel, thereby not requiring injection casting for molds, including ceramics. Another embodiment provided by the present invention may be a metal fuel that does not require heating the metal fuel or cassettes thereof from the top down prior to insertion into the reactor pool.

Another embodiment of the present invention may provide a symbiotic fuel cycle process by which LWR SNF and/or other oxide fuel forms can be more simply introduced into the fast reactor closed fuel cycle, e.g., without need for deployment of aqueous reprocessing. In another embodiment, a host matrix may be provided for any ceramic material that contained fissile and fertile elements.

Additional features, advantages, and embodiments of the invention are set forth or apparent from consideration of the following detailed description, drawings and claims. Moreover, it is to be understood that both the foregoing summary of the invention and the following detailed description are exemplary and intended to provide further explanation without limiting the scope of the invention as claimed.

BRIEF DESCRIPTION OF THE DRAWINGS

The accompanying drawings, which are included to provide a further understanding of the invention and are incorporated in and constitute a part of this specification, illustrate preferred embodiments of the invention and together with the detailed description serve to explain the principles of the invention. In the drawings.

DETAILED DESCRIPTION OF THE EMBODIMENTS

A metal particulate fuel system is described. The metal fuel system may include particulate metal fuel for use in nuclear reactors. The particulate metal fuel may include a plurality of particles of at least one enriched alloy where the particles are compacted into a fuel column. The metal particulate fuel system may also include a cladding and/or a gas-filled plenum.

Figure 3:
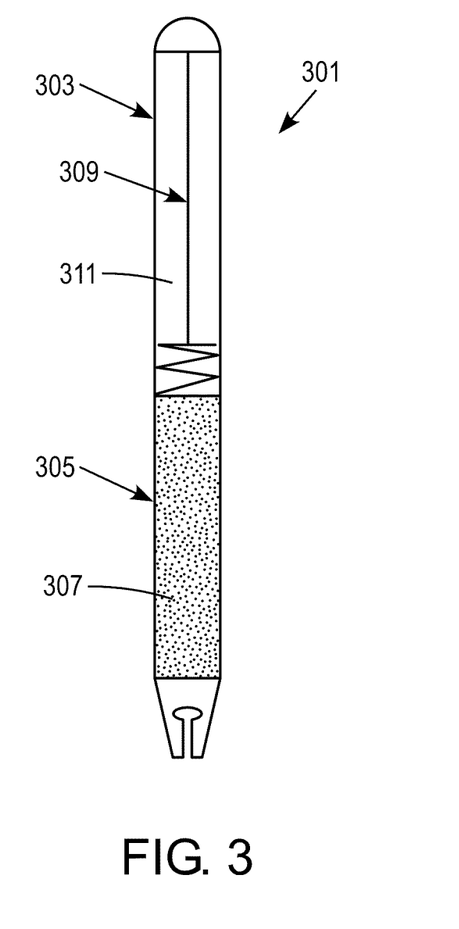
FIG. 3 shows a metal fuel element according to an embodiment of the present invention.

A metal fuel system 301 according to an embodiment of the present invention can be seen in FIG. 3. A fuel cladding tube 303 may be provided. Cladding dimensions may depend on reactor design. For existing reactor designs, cladding outer diameter ranges from approximately 0.5 to approximately 1.5 cm and wall thickness ranges from approximately 0.03 to approximately 0.08 cm. The fuel cladding tube 303 may be composed of low swelling HT-9 or oxide dispersion strengthened ("ODS") HT-9. Other compositions or additional materials may be used for various applications. The fuel cladding tube 303 may be any low-swelling alloy compatible with a particular coolant.

Metal fuel inside the fuel cladding tube 303 may be in the form of small metal fuel fragments or particles 307 of enriched alloys, e.g., uranium or uranium-plutonium. The fuel particles may range in diameter from approximately 50 to approximately 1000 microns. To achieve the desired density of approximately 75%, at least two different sizes of particles may be used. Size ranges may depend on particular uses. Technology for the manufacture of metallic uranium alloy particles may be known for other applications. Manufacturing of metal fuel particles may use an arc melting technique such that melting and solidification is rapid. Loss of volatile components, such as americium, may be minimal. Also, other established methods of powder metallurgy fabrication for production of metallic uranium alloy particles, such as hydriding-dehydriding and mechanical comminution, may be done at temperatures well below the melting point of the fuel alloys required for traditional injection casting operations.

Common alloy additions include zirconium, molybdenum, uranium-transuranics, or similar elements. In addition, the alloys could contain actinide metals, such as americium, neptunium, and curium, preferably from reprocessed fuel.

The metal fuel particles 307 may be vibrated or impacted in the fuel cladding tube 303, preferably to a density of 75% or less, into a fuel column 305. The smear density may be an initial volume occupied by the fuel divided by a total volume. A smear density of approximately 75% may be a maximum value where interconnected porosity and gas release occur before the fuel swells to the cladding. Vibration and impaction procedures may be known, and may be applied to metal fuel particles.

The fuel column 305 may be held in place by a restrainer 309, such as a simple spring arrangement or some other device to at least temporarily maintain pressure. Other restraining devices may be used, such as a small diameter rod instead of a spring. An initial gas in a plenum 311 would preferably be a gas sufficient to enhance thermal conductivity, e.g., helium. The fuel column 305 to gas plenum 311 volume ratio may be approximately 0.8 to approximately 2.0. A height of the fuel column 305 may range between approximately 0.5 m and approximately 1.5 m, dependent on a particular reactor. A length of the gas plenum 311 may range between approximately 0.8 and approximately two times the length of the fuel column 305, again dependent on the reactor.

The metal fuel system 301 may allow simplified fabrication over the current method of injection casting of sodium bonded metal fuel. The metal fuel system 301 may operate with helium bonding of the metal fuel. Technology for manufacture of metal uranium alloy particles has been developed for other applications. Uranium-molybdenum particles embedded in an aluminum matrix were developed for application in research reactors, for example. The range of available alloy compositions for particulate metal fuels is not limited as is the case for injection cast fuel where the softening of VYCOR molds was a limitation. Further, a method for the manufacture of the metal fuel particles can utilize an arc melting technique such that the melting and solidification is rapid. Loss of volatile components such as americium would, therefore, be minimal. Likewise, other established methods of powder fabrication such as hydriding-dehydriding and mechanical comminuting can also be done at temperatures well below the melting point of the fuel alloys. There is little or no waste product as there is with fissile material clinging to the VYCOR molds used for injection cast fuel. Sodium filling of the cladding tubes and the subsequent operations to remove bond voids and nondestructively inspect for voids can generally be eliminated by this method for particulate metal fuel. This method of particulate fuel fabrication may be used for remote operations.

A significant feature of a gas (e.g., helium) filled system 301, rather than sodium bonded systems, is elimination of the need to heat the fuel elements from the top down when introducing them to the reactor pool, e.g., liquid sodium. Helium is preferred due to its high thermal conductivity. This results in a significant cost savings in fuel loading equipment as well as streamlining the fuel cassette loading procedure.

Small fast reactors like an SMR of long (~20 years) refueling intervals may be deployed using enriched, metallic alloy fuel (e.g., uranium) for an initial core loading. The SMR may be self-refueling on the basis of an internal breeding ratio of one and over repeated recycles the initial enriched metallic alloy fuel composition may gradually convert itself to a transuranics-rich composition, for example, of steady-state isotopic distribution. At the end of a 15 to 20 year refueling interval, which may preferably achieve an optimal, approximately 8-10 atom % burnup, but other, less ideal burnups may be achieved, the entire core may be removed and subjected to pyrometallurgical (dry) recycling to create a replacement core. Since the fissile content needed for the new core may be self-generated in the previous core, the only feedstock required for refabrication is an approximately 8-10 weight % depleted uranium charge, for example, while an approximately 8-10 weight % fission product waste product may be extracted by the recycle step.

By way of example, the mixed enriched uranium/transuranic alloy fuel may employ a refabrication process described herein. Because of its simplicity, it could be conducted remotely behind shielding in light of the radioactive nature of the recycle feedstock. This may involve standard powder metallurgy procedures to create metal fuel alloy powders, followed by vibrocompaction of metal fuel alloy particles of up to several hundred micron size into gas, e.g., helium, bonded fuel cladding. After return to the reactor, upon approximately 1 atom % burnup, the particle bed may swell, being driven by fission gas production, and may restructure into a solid metallic alloy fuel form with interconnected fission-gas-filled porosity filling the interior radius of the cladding at a smear density of about 70 to about 75%.

The 8-10 weight % depleted uranium feedstock could be replaced with an equivalent weigh % of LWR spent nuclear fuel ("LWR SNF") in the form of crushed oxide particles. These crushed U/Pu/MA/fission product oxide particles, which are generated in a process described below, may be well mixed with the recycled uranium/transuranic metal alloy particles and then the mixed powder may be vibrocompacted into the fuel cladding as before. The process may all be done remotely. After return to the reactor, upon approximately 1% burnup, the particle bed may swell under fission gas production and restructure into a solid cermet fuel form including oxide particles embedded in a metal fuel alloy matrix. The matrix may contain interconnected porosity and filling the interior radius of the cladding at a smear density of about 70 to about 75%.

The crushed oxide may be a feedstock needed to replace the approximately 8-10 weight % fission products that are removed by the recycle step. The feedstock may preferably be primarily composed of uranium 238. The feedstock may also contain about 1.5 weight % Pu, about 0.15 weight % minor actinides and about 4 weight % fission products that are viewed as a waste to be disposed in a LWR once-through cycle.

In a symbiotic fuel cycle of embodiments of the present invention, the small amount of plutonium and minor actinides present in the LWR SNF, which make the LWR SNF so difficult to dispose of, may be consumed over multiple recycles in a closed fast reactor fuel cycle. Of particular benefit is that the volatile minor actinide, americium, remains with the other transuranic elements for recycle for fission consumption. The fission products remaining in the oxide particles may be captured when the fast reactor fuel is recycled. The contaminated uranium from the LWR SNF may remain in the fast reactor cycle, and over multiple recycles, may be bred into transuranics for in situ fission consumption as fuel. This may decrease the requirements on uranium ore mining and refining. The extra fission products contaminating the oxide particles may have only a minor effect on the fast reactor performance, because of their small cross section for fast neutron capture. LWR contaminated zircalloy cladding may be usable as feedstock for fabrication of metal alloy fuel particles or for fabrication of fission product waste forms.

The particulate-based fabrication method for metallic fuel may allow blending ceramic fuel particles with the metallic fuel particles, which may result in a self-forming cermet fuel form. At a 10 weight % oxide content in the metallic/ceramic particle mix, the cermet may have up to about 15 volume % ceramic in a metallic phase of no less than about 85 volume %. This is in a reasonable range for cermet fuel fabrication and irradiation performance.

The ceramic content of the fuel form can reduce its thermal conductivity by about 30%. While this might be problematic in a traditional fast breeder reactor, the presently claimed reactor, i.e., the SMR, does not have this problem. The SMR core power density is derated to attain an approximately 20 year refueling interval. The fuel pin linear heat rate is derated so a reduction in fuel thermal conductivity does not significantly increase fuel pin centerline temperature. This is an important feature not only for fuel irradiation performance, but also for reactor passive safety performance.

After an approximately 20 year burn cycle, attaining approximately 8-10 atom % burnup, the core of burned cermet fuel may be removed for recycle. The pyrometallurgical (dry) recycle used on the cermet fuel may include one added step as compared to the process for metal alloy fuel. This may be a reduction of approximately 8-10 weight % oxide particles into the metallic state. Otherwise the pyrometallurgical process is similar to that described above.

The crushed LWR spent fuel feedstock may be generated by one or another of the several, well-developed (dry) decladding/crushing processes for LWR spent fuel, for example, Atomics International Reduction/Oxidation ("AIROX"), Oxidation and Reduction of Oxide fuel ("OREOX"), or Pulverization and Decladding technology for Oxide fuel ("PULDOX"). These processes consist of breaching the LWR fuel cladding in a confined atmosphere, followed by one or more cycles of oxidation, of $UO_2$ to $U_3O_8$ for example, and reduction, back to $UO_2$, for example. The associated density changes of about 30% may rupture the cladding and crumble the oxide fuel to facilitate its separation from the ruptured clad. Oxide recovery of about 90% to about 99% can be attained. The oxidation may be done in an air or oxygen atmosphere at about 400 degrees Celsius. The reduction is preferably done in a dilute $H_2$-containing Argon atmosphere at about 700 degrees Celsius. Gaseous and volatile fission products may be released and captured while the non-volatile fission products remain in the crushed oxide particles.

The particle size distribution needed for the vibrocompaction refabrication step can be controlled by the number of oxidation/reduction cycles and by hold times at temperature. Further size reductions, if necessary or preferred, can be achieved with micronization techniques known in the art. The technologies for capturing gaseous and volatile fission products released in the crushing operations are standard and the resulting waste forms are no different from those already required and used for the pyrometallurgical recycle processes.

If desired, embodiments of the present invention could accelerate cleanup of the LWR SNF legacy by not waiting for the first recycle 20 years hence, but rather, by placing self-forming cermet fuel in the initial core loadings of the SMR reactors discussed above. This acceleration could entail building the remote shielded fuel fabrication and the LWR treatment facilities at the beginning of the SMR deployment campaign rather than waiting 20 years to build them in time for the first recycle campaign SMR spent cores.

For the accelerated cleanup of LWR SNF legacy, the oxide content of the first core loads may be increased from about 10 weight % to about 25 weight % of the fuel form. This corresponds to about 15% fissile content in a mix of the ceramic with about 20% enriched metallic fuel feedstock. This remains in the feasible range for powder metallurgy fabrication of cermets. It also remains in the feasible range from thermal conductivity consideration, given the SMR's low power density fuel pins. Each SMR core of about 15 tonnes fuel content would thereby consume about 3.75 tonnes or more of LWR SNF. Over the approximately 20 years leading up to the first recycle of SMR cores, at a build rate of 100 SMR's per year, this symbiotic cycle would consume: 0.25*15*100*20=about 7500 tonnes out of the overall about 60,000 tonnes of legacy LWR SNF.

Breeder reactors may be deployed starting around 2030. Here the drawdown rate of LWR SNF still could be further accelerated by using high content oxide containing self-forming cermet fuel in low power density blankets. Alternatively, the crushed LWR SNF could be reduced to metallic feedstock for blanket fabrication, retaining U, Pu, MA, and fission products, for injection into the fast reactor closed fuel cycle.

Eventually, ore reserves may become scarce and the price of enriched uranium may dictate that new deployments of SMR's and Breeder reactors should be fueled not by enriched uranium, but rather by transuranics or a blend of transuranics and enriched uranium, for example. This feedstock is not required to come from aqueous processing of LWR SNF but may be recovered from SMR and Breeder SNF. This is because while LWR SNF contains only about 1.5 weight % fissile material, SMR and Breeder SNF contains about 15 to 20 weight % fissile material so that the required reprocessing throughput is reduced by a factor of about ten to harvest the same fissile material recovery. Even breeder blankets can be expected to have a factor of five greater fissile material compared to an equal mass of LWR SNF. In the symbiotic fuel cycle proposed here, LWR SNF would be treated as a substitute for depleted uranium and would not be treated as a source of fissile material. The small amount of fissile material present in LWR SNF inevitably gets captured into the proposed symbiotic closed fuel cycle, but does so in a cost-effective way.

The proposed evolutionary conversion from an open to a closed fuel cycle can and should be done using the symbiotic dry technologies proposed here that precludes any requirement for aqueous processes.

Figure 4:
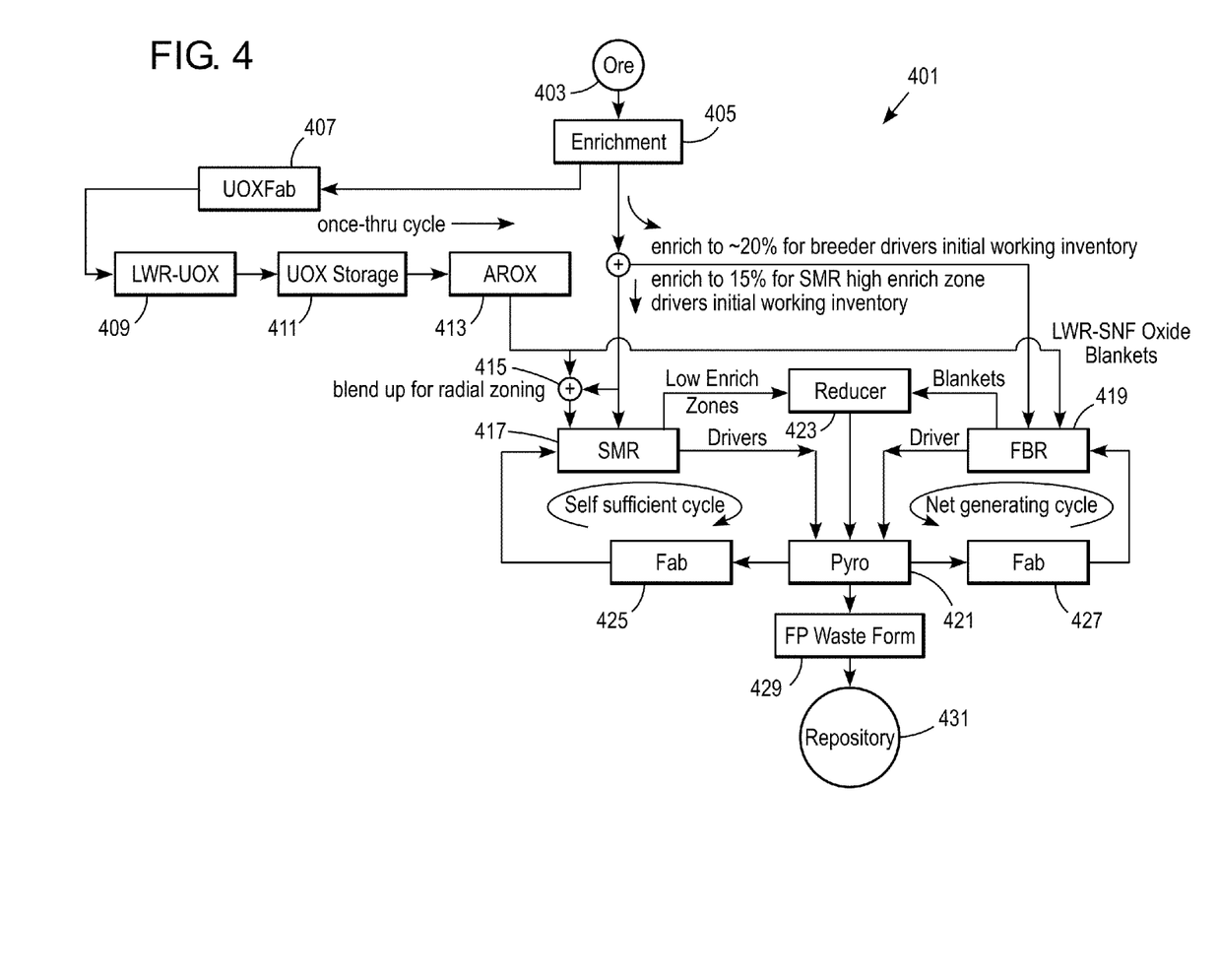
FIG. 4 shows a symbiotic fuel cycle according to an embodiment of the present invention.

An example of a symbiotic fuel cycle 401 in its ultimate sustainable realization is illustrated in FIG. 4. Ore 403 may initially be enriched 405. At least a portion of the enriched ore may be fed to UOX fabrication 407 in a once-through cycle. The product may then pass through LWR-UOX 409, UOX storage 411, and/or AROX 413. The product may then be blended up 415 for radial zoning before entering a SMR 417 or used in a LWR SNF oxide blanket for a FBR 419.

Alternatively, the enriched ore may be further enriched to about 20% for breeder driver initial working inventory before entering the FBR 419. The enriched ore may also be enriched to about 15% for SMR high enrich zone driver initial working inventory. The enriched ore may then be blended up 415 before entering the SMR 415 or directly enter the SMR 415.

The SMR 415 may output low enrich zones fed to a reducer 423. Blankets from the FBR 419 may also be fed to a reducer 423. The SMR 415, reducer 423 and/or the FBR 419 may output drivers to a pyro 421. In a self-generating cycle, output from the pyro 421 may be fed into a fabricator 425 and back to the SMR 417. In a net generating cycle, output from the pyro 421 may be fed into a fabricator 427 and back to the FBR 419. Output from the pyro 421 may also be fed to an FP waste form 429 and stored in a repository 431.

This technology may create a self-forming cermet fuel as a modification to existing technology. The LWR SNF and/or other oxide fuel forms can be introduced into the fast reactor, e.g., SMR, closed fuel cycle without need for deployment of aqueous reprocessing. Certain embodiments would be expected to provide the following advantages:

a. Confining the plutonium and minor actinides generated by the LWR in a fast reactor closed fuel cycle where they can be consumed as a fuel;

b. Inserting the fission products generated by the LWR into a fast reactor closed fuel cycle where they can later be entombed in stable waste forms for disposal;

c. Employing a low temperature process that can retain the volatile americium minor actinide with other actinides for fast reactor recycle as a fuel and may thereby preclude their contribution as a long term contributor to waste toxicity in a repository;

d. Introducing few if any new waste forms besides those already created by the pyrometallurgic recycle process;

e. Increasing the efficiency of use of uranium ore by nearly a factor of 100; and f. Providing a flexible strategy that may provide several decades of delay time prior to any need for deployment of dry recycle technology for fast reactor cermet fuel and for deployment of dry technology for injecting LWR SNF into the fast reactor closed fuel cycle. Alternatively, it could facilitate a more rapid drawdown of legacy LWR SNF starting as soon as SMR's go into production.

The particulate metal fuel can be the host matrix for any ceramic material that contained fissile and fertile elements. The only restriction being that the concentration of the ceramic material is preferably limited such that upon irradiation the host metal matrix can be continuous. With a continuous metal matrix, all the excellent features of metal fuel can be preserved. One important example is the fissioning of americium by purposely collecting volatile americium and oxidizing it into a less volatile oxide to facilitate including americium as an oxide in the metal fuel matrix.

Conventional fuel reprocessing techniques have difficulty containing the americium due to its high volatility. Embodiments of the present invention preferably effectively capture and fission americium, which is one of the most troublesome of all waste products. Therefore, the americium does not end up as a waste but becomes yet another fissionable isotope from which energy is gained.

Studies of offsite doses from a non-saturated zone repository show that the peak dose at about 64,000 years is due to Np237, which is an alpha emitter with a half life of 2.41 million years. Np237 is a daughter product of Am241 alpha decay with 432 year half life, and Am241 is itself the daughter of Pu241 beta decay with a 14.35 year half life.

Both Am241 and Pu241 are generated in nuclear reactor discharged fuel. In a closed fast reactor fuel cycle Pu241 is present at about 0.5 weight % of heavy metal and Am241 is present at about 0.15 weight % of heavy metal at spent fuel discharge. For an open cycle LWR, the percentages are 0.19 weight % and 0.4 weight %, respectively. These relatively small weight fractions of discharged fuel none-the-less give rise to a dominant hazard of long term waste disposal.

To prevent the buildup of Np237, which may eventually dominate the offsite dose from a nuclear waste repository, it may be beneficial to recycle its progenitor isotopes, Pu241 and Am241, back into the fast reactor where they can be consumed by fission. Since both are productive (fissionable) fuel in a fast reactor, it is desirable from the point of view of reactor design. In the case of Am, however, a difficulty is encountered in recycling because Am is a volatile specie at the temperatures normally encountered in the basic pyrometallurgical processes for fast reactor recycle.

The pyrometallurgical process may involve three high temperature processes where americium losses are possible. The first is in an electrorefining operation, at a relatively low temperature of approximately 500 degrees Celsius, where the americium may exist as a chloride and volatile losses are expected to be negligible. The second is a retorting of the liquid cadmium cathode at similar temperatures, and finally the most troublesome americium loss may occur during injection casting of fuel slugs at approximately 1600 degrees Celsius. In the injection casting process, the americium may tend to vaporize and deposit on colder parts of the equipment. Casting techniques have been tried that are partially successful in reducing the americium losses by reducing the time at temperature and by reducing the gas volume over the melt. These solutions, however, are not ideal.

The metal fuel and fabrication methods discussed above describe the fuel inside the cladding as a particulate metal alloy, e.g., uranium, whereby after a short irradiation period the fuel may behave as a porous solid pin not unlike earlier metal fuel designs. Several advantages are inherent in this particulate design where it is helium bonded instead of sodium bonded. The metal fuel may be extended to include the addition of particulate spent commercial uranium oxide fuel within the metal fuel particulate matrix. As long as the concentration of particulate spent fuel is kept below a certain limit, the particulate metal fuel may be expected to form a continuous matrix within the fuel pin. The volume fraction of particulate spent fuel preferably is kept below approximately 25% to assure a continuous matrix of metal fuel. With a continuous metal fuel matrix, the benefits associated with metal fuel can be preserved; high thermal conductivity and interconnected porosity being among the most important properties, along with a helium bond instead of a sodium bond.

One important improvement in certain embodiments of the present invention may be to allow the particulate metal fuel matrix to be a universal host for other particulate fuels. With a concept for a host metal matrix, americium may be purposely vaporized, collected, and oxidized at the process step where the cadmium cathode is returned. The americium product can be collected on a cold collection finger and oxidized for inclusion as a particulate in the host metal matrix.

The particulate metal fast reactor fuel, with americium oxide as an inclusion may then be irradiated to fission the americium and not only destroy the americium but also gain energy. It is expected that maximum americium oxide in the particulate metal matrix of preferred embodiments would not exceed approximately 1 weight %. Approximately 1 weight % of americium oxide may be a maximum expected for reprocessed fuel.

The concept for inclusion of spent fuel, especially when in particulate form, in the metal fuel particulate matrix may be extended to other spent fuels such as uranium carbides, uranium nitrides, and mixed uranium-plutonium oxides, carbides, and nitrides. The primary condition may be that the concentration of metal fuel in the matrix should be high enough to form a continuous matrix such that all the benefits of metal fuel are realized. A volume fraction of carbides, nitrides, and oxides preferably is kept below approximately 25% to assure a continuous matrix of the metal fuel.

This concept of including particles of non-metallic form in the metal particle matrix is supported by observations of non-metallic inclusions in uranium-zirconium and uranium-plutonium-zirconium fuels during the normal course of irradiation. In these fuels the zirconium tends to combine with any oxygen and nitrogen in the system to form inclusions of zirconium oxide and zirconium nitride. In addition, the zirconium combines with carbon, which is carried over from melting in graphite crucibles, to form zirconium carbide inclusions in the metal matrix. These oxide, nitride, and carbide inclusions would have little or no detrimental effect on performance. The volume fraction of these inclusions is well within the range of the expected volume fraction of americium oxide. A volume fraction of americium oxide may be in the range of approximately 1%. In fact, these carbide and oxide inclusions have been an unintentional feature of metal fuel that is part of the extensive experience base that exists for metal fuels.

The embodiments disclosed herein are preferably integrated in an SMR; however, the particulate metal fuel of the present invention, and the embodiments thereof, also have applicability to other reactor concepts. The core configuration, fuel handling equipment and the SMR reprocessing and refabrication technology may all benefit from the embodiments described herein. The result may reduce the cost of equipment and fuel, add to the uniqueness and simplification of an SMR, and should be attractive to those concerned about the fate of the 70,000 tons of LWR spent fuel that is now in interim storage. The technologies are applicable beyond the SMR and could apply to diverse fast reactor designs worldwide.

Figure 5:
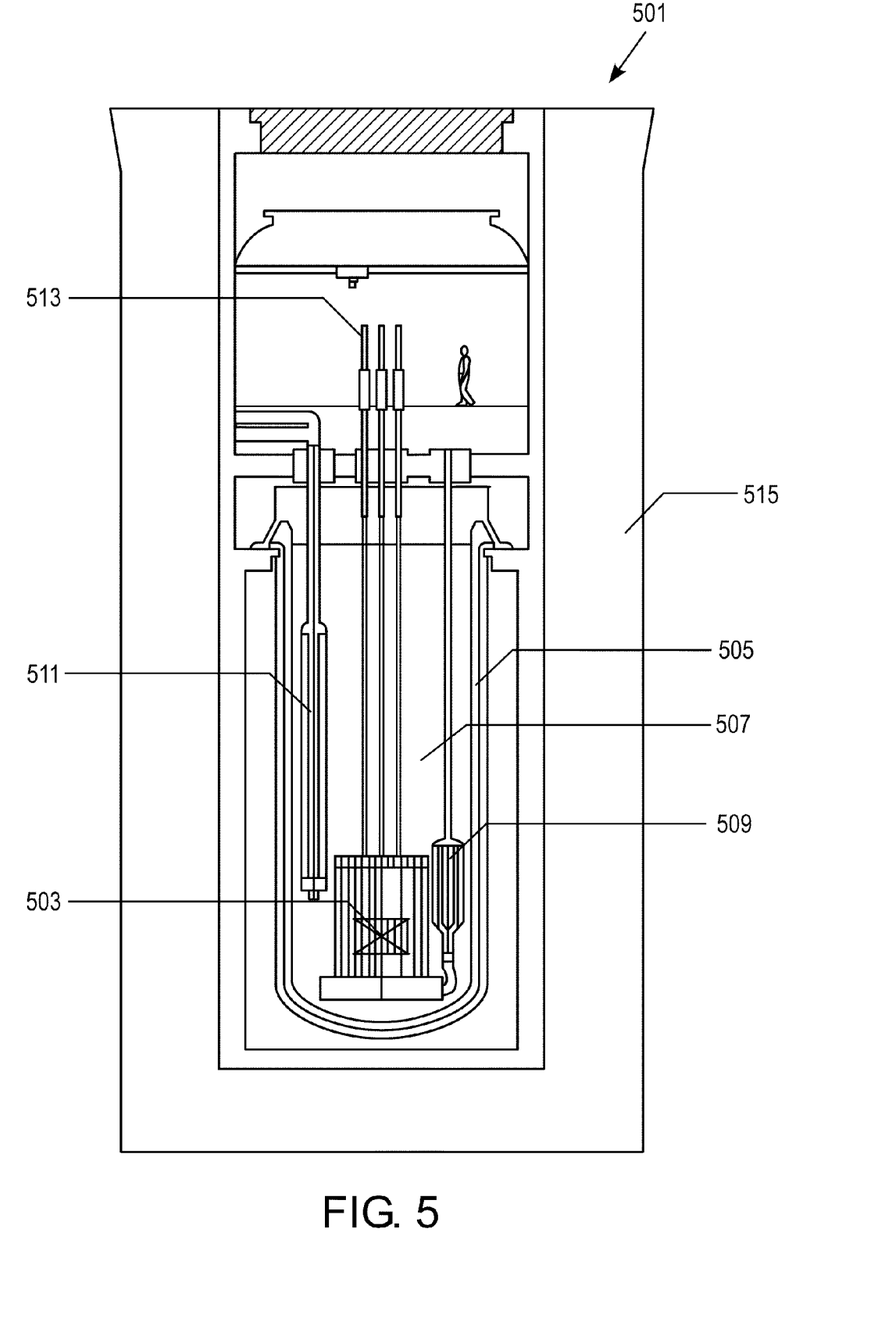
FIG. 5 shows an exemplary Small Modular Reactor ("SMR") according to an embodiment of the present invention.

An exemplary SMR system 501 of the present invention, as shown in FIG. 5, may include a uranium-fueled core 503, submerged in a tank 505 of ambient pressure liquid sodium 507. The SMR system 501 may also include control rods 513 and be encased in concrete 515. The liquid sodium 507 from the tank 505 may be pumped by a pump 509 through the core 503 to carry heat away to a heat exchanger 511, also submerged in the tank 505 of sodium 507. The sodium 507 may be heated to about 510 degrees Celsius.

Figure 6:
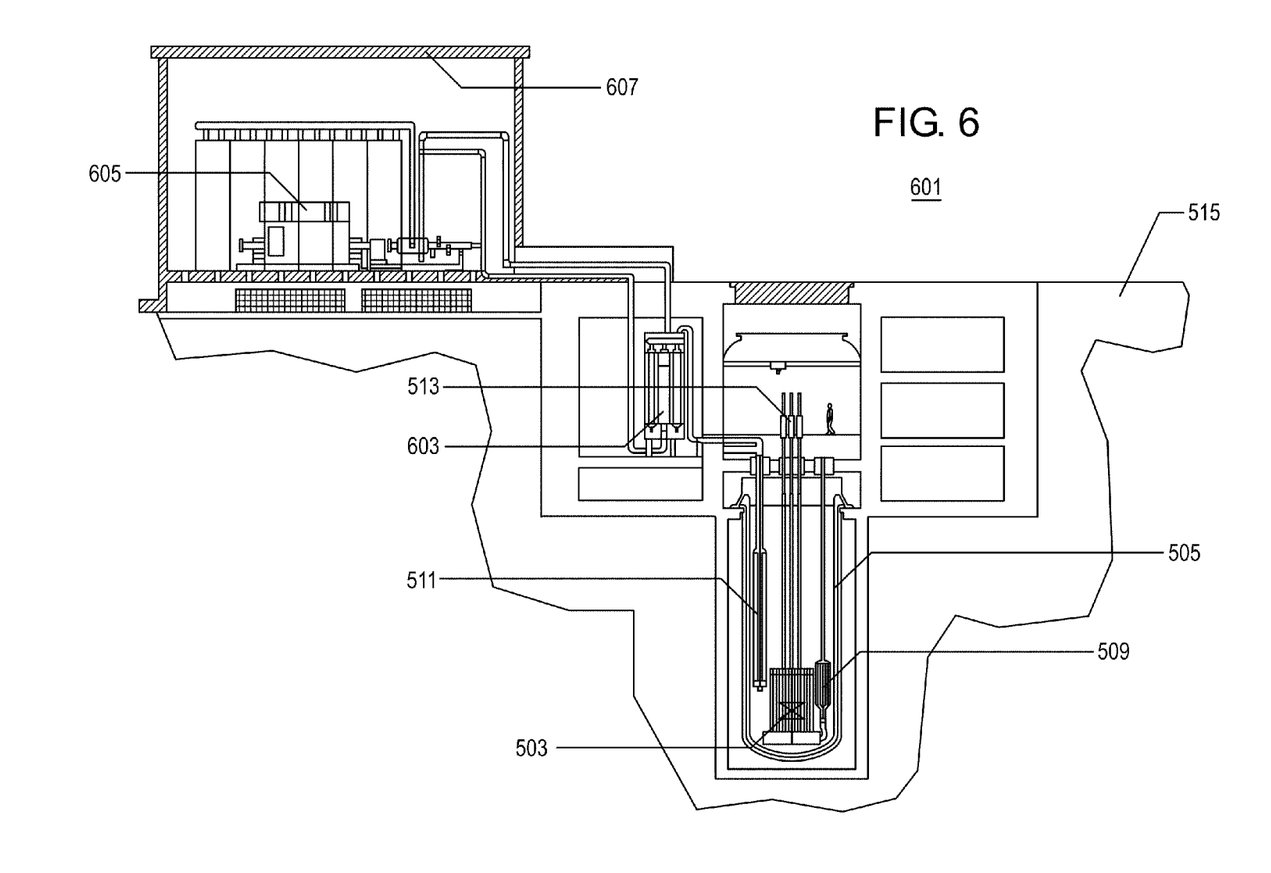
FIG. 6 is an example of an SMR nuclear power plant of the present invention.

FIG. 6 shows the SMR system 501 within a larger energy generation system 601. The heated sodium 507 may pass through the heat exchanger 511 to heat secondary sodium, which in turn passes through a heat exchanger 603 where the secondary sodium heats supercritical (almost liquid) carbon dioxide. The heated supercritical carbon dioxide may then be used to spin a gas turbine to make electricity in an electrical generator 605 in a carbon dioxide Brayton cycle building 607. As suggested, this type of system is typically called the Brayton cycle and may provide the SMR a thermal efficiency (heat energy to electricity) of approximately 39% to approximately 41% or more, an efficiency much higher than conventional LWR steam driven turbines. In addition, waste heat can be used to meet lower-temperature needs, such as space heating, fresh water desalination, industrial process heat, or can be dissipated through cooling towers.

Small sodium-cooled fast reactors demonstrate important inherent safety characteristics that may allow an SMR to be operated with simplified, fail-safe controls that facilitate rapid licensing by regulatory authorities. In response to an accident condition, such as loss of coolant flow to the reactor or to loss of the ability to reject heat from the reactor system, embodiments of the reactor may shut themselves down without human or safety-system intervention because as the reactor coolant heats up, the reactor may cause the core structures to thermally expand causing increased neutron leakage from the core, in turn causing power levels to decrease in a self-correcting fashion.

SMR operation requirements may be significantly simpler than conventional nuclear systems, a characteristic that allows the reactor to follow load requirements brought upon by varying levels of electricity demand. Metal alloy fuel is well demonstrated, both from performance and fabrication perspectives, and can straightforwardly meet long refueling time interval requirements.

The reactor core may have a long life, up to about 20 years or more, without the need for refueling. The whole reactor core may be replaced at once about every 20 years. As such, the reactor system may have no requirement that the operator handle fuel. The overall unit may be sealed, physically and with electronic monitors, so that any intrusion attempt is easily detected. The elimination of any need or the ability to gain direct access to the fuel and use of smart monitoring systems not only reduces operator requirements, but also addresses proliferation concerns. Additionally, the SMR is small enough to be located below ground, which enhances containment and protection from terrorist activities. Finally, embodiments of the system are small enough that they can be shipped by barge and installed at the site using modular construction techniques: this ability to remotely manufacture and obtain economies of serial production is a desirable benefit.

When the fuel cartridges are returned to the manufacturer/designer/fabricator's facility, nearly all of the used nuclear material can be recycled and used as fuel in future cartridges, greatly reducing the volume and radio-toxicity of the final waste to be stored in a geologic repository. Unlike waste from conventional light water reactors, material from SMR's need not be stored for tens of thousands of years. Non-recyclable materials from SMR's require only a few hundred years of storage before the waste decays to levels of radiation associated with the original uranium ore.

Although the foregoing description is directed to the preferred embodiments of the invention, it is noted that other variations and modifications will be apparent to those skilled in the art, and may be made without departing from the spirit or scope of the invention. Moreover, features described in connection with one embodiment of the invention may be used in conjunction with other embodiments, even if not explicitly stated above.

What is claimed is:

1. A metal fuel system comprising:
   particulate metal fuel for use in nuclear reactors, comprising particles of at least one enriched alloy and particles of crushed light water reactor (LWR) spent nuclear fuel;
   a cladding;
   a gas-filled plenum; and
   wherein the particles are compacted into a fuel column, and wherein the fuel column is in particulate form, not solid form, upon entry into a reactor.

2. The metal fuel system of claim 1, wherein the compaction is obtained by vibration or another impaction technique.

3. The metal fuel system of claim 1, wherein the at least one enriched alloy is selected from the group consisting of: uranium, plutonium, transuranics, zirconium, molybdenum, actinides, and combinations thereof.

4. The metal fuel system of claim 1, wherein the particulate metal fuel further comprises minor actinides.

5. The metal fuel system of claim 1, further comprising a gaseous heat transfer medium in the cladding.

6. The metal fuel system of claim 5, wherein the gaseous heat transfer medium is helium gas.

7. The metal fuel system of claim 1, wherein the smear density of the fuel column is approximately 75% or less.

8. The metal fuel system of claim 1, wherein a volume ratio of particulate metal fuel to plenum is approximately 0.8 to approximately 2.0.

9. The metal fuel system of claim 1, further comprising a restrainer to maintain pressure on the fuel column.

10. The metal fuel system of claim 1, wherein the particles are between about 50 and about 1000 microns in diameter.

11. The metal fuel system of claim 1, wherein the particulate metal fuel comprises approximately 8-10% crushed light water reactor (LWR) particles.

12. A metal fuel system comprising:
   particulate metal fuel for use in nuclear reactors, comprising particles of at least one enriched alloy, wherein the particulate metal fuel further comprises minor actinides;
   a cladding;
   a gas-filled plenum; and
   wherein the particles are compacted into a fuel column, and wherein the fuel column is in particulate form, not solid form, upon entry into a reactor.

13. The metal fuel system of claim 12, wherein the minor actinides are selected from the group consisting of: americium, neptunium, curium, and combinations thereof.

14. The metal fuel system of claim 12, wherein the particulate metal fuel further comprises crushed light water reactor (LWR) particles.

15. The metal fuel system of claim 14, wherein the particulate metal fuel comprises approximately 8-10% crushed light water reactor (LWR) particles.

16. The metal fuel system of claim 12, wherein the at least one enriched alloy is selected from the group consisting of: uranium, plutonium, transuranics, zirconium, molybdenum, actinides, and combinations thereof.

17. The metal fuel system of claim 12, wherein the particles are between about 50 and about 1000 microns in diameter.

18. A metal fuel system comprising:
   particulate metal fuel for use in nuclear reactors, comprising particles of at least one enriched alloy and particles of crushed light water reactor (LWR) spent nuclear fuel, wherein the particulate metal fuel further comprises minor actinides;
   a cladding;
   a gas-filled plenum; and
   wherein the particles are compacted into a fuel column, and wherein the fuel column is in particulate form, not solid form, upon entry into a reactor.

19. The metal fuel system of claim 18, wherein the minor actinides are selected from the group consisting of: americium, neptunium, curium, and combinations thereof.

20. The metal fuel system of claim 18, wherein the particulate metal fuel comprises approximately 8-10% crushed light water reactor (LWR) particles.

21. The metal fuel system of claim 18, wherein the at least one enriched alloy is selected from the group consisting of: uranium, plutonium, transuranics, zirconium, molybdenum, actinides, and combinations thereof.

22. The metal fuel system of claim 21, wherein the at least one enriched alloy is uranium.

* * * * *